No. 852,716. PATENTED MAY 7, 1907.
M. W. HALL.
TIRE REPAIRING PLUG.
APPLICATION FILED NOV. 25, 1905.
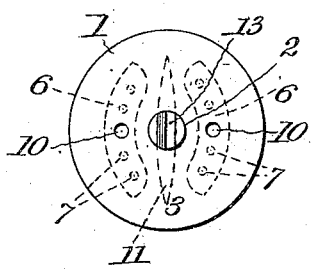
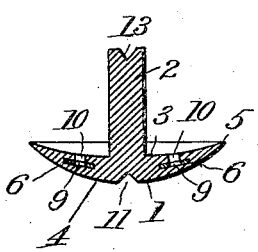
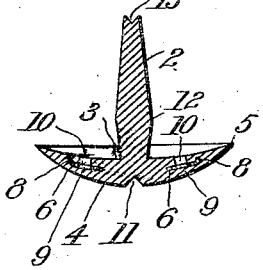
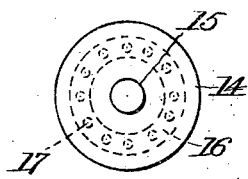
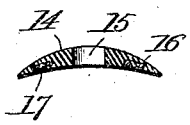
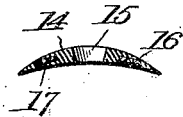
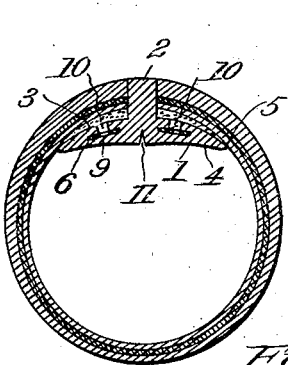
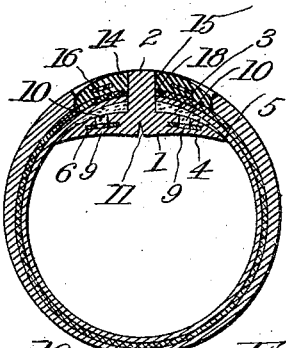
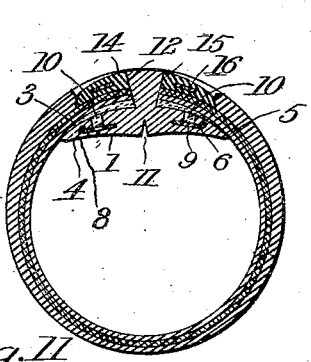
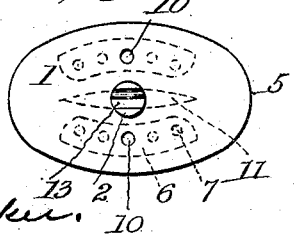
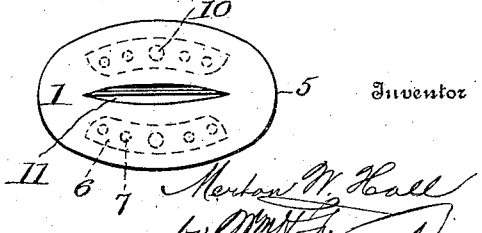

UNITED STATES PATENT OFFICE.

MERTON W. HALL, OF GLOVERSVILLE, NEW YORK.

TIRE-REPAIRING PLUG.

No. 852,716.　　　Specification of Letters Patent.　　　Patented May 7, 1907.

Application filed November 25, 1905. Serial No. 289,095.

*To all whom it may concern:*

Be it known that I, MERTON W. HALL, a citizen of the United States, residing at Gloversville, in the county of Fulton and State of New York, have invented a certain new and useful Improvement in Tire-Repairing Plugs, of which the following is a full, clear, and exact description.

This invention relates to repair plugs for pneumatic tires, and more particularly to elastic plugs of the mushroom or umbrella type.

The object of this invention is to provide an elastic repair plug of the mushroom or umbrella or common flat type for pneumatic tires for bicycles and motor vehicles, which is more easily applied, and is more effective and durable, than repair plugs of this character heretofore constructed.

The invention consists in an elastic repair plug having a reinforce of metal or other suitable material embedded therein. Also in an elastic repair plug having a substantially diametrically arranged groove in the outer surface of its head to thereby facilitate the doubling of the head to insert it through the puncture, and also reduce the tendency of the head to pull away from the inside of the tire. Also an elastic repair plug of this character having means for indicating the position of the head of the plug after it has been inserted in a puncture. Also in an elastic washer for more firmly securing such plug in place; and also in the details of construction, all as I will proceed now more particularly to set forth and finally claim.

In the accompanying drawings illustrating my invention, in the several figures of which like parts are similarly designated, Figure 1 is a top plan view. Fig. 2 is a vertical section. Fig. 3 is a vertical section of a modified form of plug. Fig. 4 is a plan view of the elastic washer. Fig. 5 is a cross-section of the washer of Fig. 4. Fig. 6 is a cross-section of another form of washer to be used in connection with the plug of Fig. 3. Fig. 7 is a transverse section of a pneumatic tire showing the application of my plug without a holding washer. Fig. 8 is a cross-section of a pneumatic tire, showing the application of a holding washer of modified form. Fig. 9 is a transverse section of a tire showing the application of the plug of Fig. 3 and holding washer of Fig. 6. Fig. 10 is a top plan view and Fig. 11 is a bottom plan view of a plug constructed in accordance with my invention and having an oblong head.

In carrying out my invention the plug may be constructed of any usual elastic material and of flat, mushroom or umbrella shape with the head 1 and stem 2. As shown in the drawings, the head 1, is constructed with a concave inner surface 3 from its outer edge to the base of the stem, and a convex outer surface 4, thereby providing a plug with a substantially raised outer extremity or flange terminating in a rather sharp and flexible edge 5 to more firmly contact with the inner side of the tire when the plug is put to place; but the head may be made flat on both sides. The head 1 is also provided with stiffening or reinforcing plates 6, constructed of metal or any other suitable material and preferably of crescent shape and arranged upon opposite sides of the axis of the stem 2, substantially in parallelism. The plates 6 are preferably embedded in the plug during the process of manufacture, and are provided with perforations 7 into which the material of the plug will enter to more firmly hold the plates in position.

As shown in Figs. 1, 2, 7 and 8 the plates 6 are made perfectly flat or plane, while in Figs. 3 and 9 the said plates are constructed with an upturned flange 8 on their outer edges, to effect a firmer pressure of the plug at that point against the tire when the plug is drawn to place. The plates 6 are also provided with a central perforation 9, or any other suitable aperture, registering with openings 10 in the upper surface of the head 1, and adapted to receive gripping projections on jaws of a pair of pliers usually employed for doubling and holding the head of the plug while forcing it through a puncture. The outer convex face of the head 1 of the plug is provided with a transverse, preferably central, groove 11, of V or other shape, and arranged between the plates 6, thus permitting the head to be doubled or folded in line with said groove in a much easier manner than would be possible if the head were solid throughout its entire surface, and said groove 11, also reduces the tendency of the head to pull away from the tire when the plug is drawn to place upon the inside of the tire.

The stem 2 may be straight or cylindrical as shown in Figs. 1, 2, 7 and 8; or it may be constructed with an enlargement 12, tapering toward the head and to its outer end. The stem is also provided at its outer end with a notch or groove 13, coinciding in its arrangement with the groove 11 in the head 1, whereby the position of the head after it has been inserted in the tire may be determined.

In connection with the plugs above described and in accordance with my invention, I provide an elastic washer 14 which may be used to more firmly secure the plugs in place. The washer 14, is constructed of any suitable elastic material, preferably in the form of a concavo-convex disk, with a central perforation 15 to snugly fit the stem of the plug. The said washer is also provided with a stiffening or reinforcing ring 16, embedded therein in the process of manufacture, and constructed of metal or any other suitable material, and provided with a series of perforations 17 through which the material of the washer flows, to more firmly hold the ring in place. See Figs. 4, 5 and 6. In Fig. 5 I have shown the perforation 15 as being straight or cylindrical to fit the stem of the plug shown in Figs. 1, 2, 7 and 8, and in Fig. 6 the perforation is shown as tapering to fit the enlargement 12 of the stem of the plug shown in Figs. 3 and 9.

As shown in Fig. 8, the washer may be provided with a slightly extended flange 18 surrounding the perforation upon the concave side of the washer.

In applying the plug, the projections on the jaws of the pliers are placed in the perforation 10 and in engagement with the apertures 9 in the plates 6, and the gripping ends of the pliers forced together, thus doubling or folding the head 1 centrally in line with the groove 11, forcing the walls of the groove close together. The plug is dipped in the usual cement, and as thus firmly gripped by the engagement of the pliers with the metal reinforcing plates 6, and without any possibility of slipping, the plug can readily be forced through a puncture and the pliers released. The plug is then properly positioned by observing the notch or groove 13, in the upper end of the stem 2, and turning the plug until the said notch or groove 13 is in longitudinal alinement with the tire, thus bringing the reinforcing plates 6 and the groove 11 of the head in proper position for drawing the plug to place upon the inside of the tire.

As shown in Fig. 7, the plug may be applied with cement without the use of a holding washer, the plug being pulled or drawn to place and its stem cut off even with the tread surface of the tire as is usual in repair plugs of this character, or the plug may be secured in place by the application of a washer of any of the forms described, and Fig. 8 illustrates such application of one form, while Fig. 9 illustrates the application of another form. The tread surface of the tire is recessed sufficiently to receive the washer which is cemented therein, with the stem of the plug extending through its perforation 15 and the stem is drawn or pulled outwardly through the washer to obtain a final setting of the parts, and the stem is then cut off even with the outer surface of the washer.

In Fig. 8, it will be seen that the washer is provided with an inwardly extending flange about its perforation, said flange providing an additional cementing surface between the washer and stem. It will be understood that either of the forms of washers herein shown may be provided with an inwardly extending flange surrounding its perforation.

In Fig. 9, the plug of Fig. 3 is shown as held in place by a washer, such as shown in Fig. 6, the tapering opening of the washer having been forced over the enlargement 12 and in engagement with the lower inwardly tapering portion of the stem, thus making a very secure union between the washer and stem, substantially like a dovetail. The plug of Fig. 3 may also be used without the washer. The head of the plug may be circular or any other desired shape, and I have shown in Figs. 10 and 11 a plug constructed in accordance with my invention, having an oblong head.

In Fig. 11, the arrangement of the transverse groove is shown in detail, and in Figs. 1 and 10 in dotted lines.

Variations in the details of construction and arrangement of parts are within the scope of this invention. It may be noted also that the cement used in setting the plug may be applied in any of a number of ways.

Among the advantages of this invention, it might be stated that the plug will not cut through and injure a soft resilient tire, and does not produce the unsightly appearance or the disagreeable clicking noise on a pavement, as do the common brass plugs or rubber plugs with a brass top or washer.

What I claim is:—

1. A repair plug for pneumatic tires, comprising a head and a stem of elastic material, and metallic plates embedded in said head upon opposite sides of the axis of said stem.

2. A repair plug for pneumatic tires, comprising a head and a stem of elastic material, and substantially crescent-shaped reinforcing plates embedded in said head upon opposite sides of the axis of said stem.

3. A repair plug for pneumatic tires, comprising a head and a stem of elastic material, and perforated substantially crescent-shaped reinforcing plates embedded in said head upon opposite sides of the axis of said stem.

4. A repair plug for pneumatic tires, comprising a head and a stem of elastic material, and flanged substantially crescent-shaped reinforcing plates embedded in said head upon opposite sides of the axis of said stem.

5. A repair plug for pneumatic tires, comprising a head and a stem of elastic material, and reinforcing plates embedded in said head upon opposite sides of the axis of said stem and provided with plier-receiving apertures.

6. A repair plug for pneumatic tires, comprising a head and a stem of elastic material, the said head provided with a substantially central transverse groove in its outer face.

7. A repair plug for pneumatic tires, comprising a head and a stem of elastic material, the said head provided with a substantially central transverse V-shaped groove in its outer face.

8. A repair plug for pneumatic tires, comprising a head and a stem of elastic material, the said head provided with a transverse groove in its outer face, and reinforcing plates embedded in said head upon opposite sides of said groove and the axis of said stem and substantially parallel with said groove.

9. A repair plug for pneumatic tires, comprising a stem and a head of elastic material, the said head provided with a diametrically arranged groove in its outer face, and reinforcing plates embedded in said head upon opposite sides of said groove and in substantial parallelism with said groove, and plier-receiving apertures in said plates.

10. A repair plug for pneumatic tires, comprising a head and a stem, reinforcing plates embedded in said head upon opposite sides of the axis of said stem, and means on said stem for indicating the position of said head and its reinforcing plates when placed in a tire.

11. A repair plug for pneumatic tires, comprising a head and a stem, and reinforcing plates embedded in said head upon opposite sides of the axis of said stem, the said stem provided with a notch in its upper end to indicate the position of said head and its reinforcing plates when placed in the tire.

12. A repair plug for pneumatic tires, comprising a head and a stem of elastic material, the said head provided with a diametrically arranged groove in its outer face, and said stem provided with a notch to indicate the position of the groove in said head for positioning said head when placed in a tire.

13. A repair plug for pneumatic tires, comprising a head and a stem of elastic material, the said head provided with a diametrically arranged groove in its outer face, reinforcing plates embedded in said head upon opposite sides of said groove and in substantial parallelism with said groove, and a notch in said stem in alinement with said groove and plates, to indicate the position of said groove and plates when the head is inserted in a tire.

14. A repair plug for pneumatic tires, comprising a head and a stem of elastic material, combined with an elastic washer having a reinforcing ring embedded therein, and a central perforation adapted to engage the stem of the plug upon the outside of the tire.

15. A repair plug for pneumatic tires, comprising a head and a stem of elastic material, combined with an elastic washer having a perforated reinforcing ring embedded therein, said washer adapted to engage the stem of the plug upon the outside of the tire.

16. A repair plug for pneumatic tires, comprising a head and a stem of elastic material, the said stem having a tapering enlargement, combined with an elastic washer having a tapering opening adapted to engage the tapering enlargement of the stem upon the outside of the tire.

In testimony whereof I have hereunto set my hand this 17th day of November A. D. 1905.

MERTON W. HALL.

Witnesses:
W. D. WELCH,
F. T. AVERY.